A. H. TWOMBLY.
COMPOSITION YIELDING OZONE.
APPLICATION FILED MAY 14, 1909.
984,722.
Patented Feb. 21, 1911.
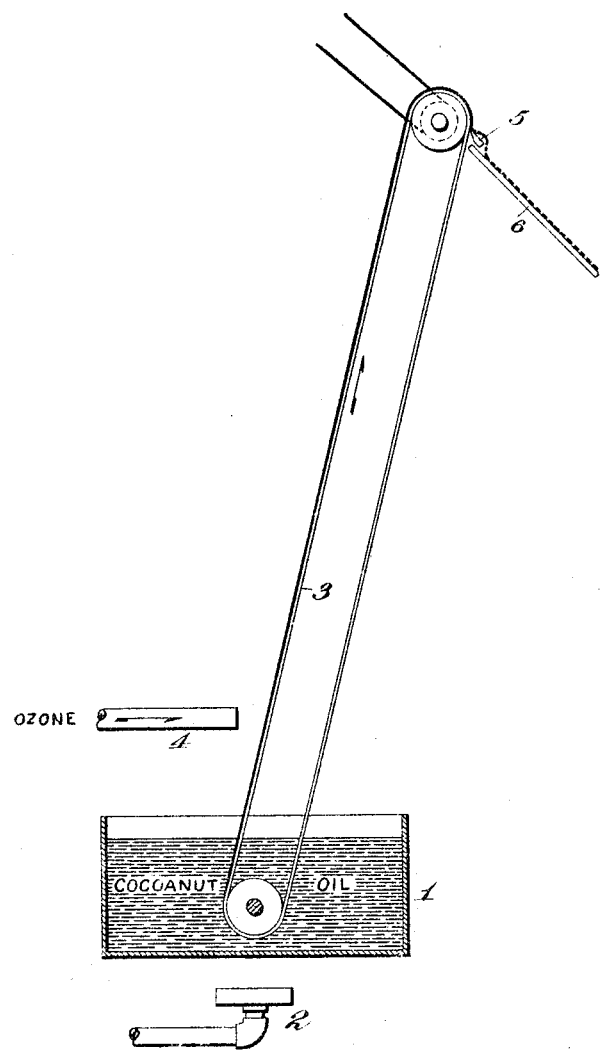

UNITED STATES PATENT OFFICE.

ALEXANDER H. TWOMBLY, OF SUMMIT, NEW JERSEY, ASSIGNOR TO GERARD OZONE PROCESS COMPANY, OF NEW YORK, N. Y., A CORPORATION OF NEW JERSEY.

COMPOSITION YIELDING OZONE.

984,722.  Specification of Letters Patent.  Patented Feb. 21, 1911.

Application filed May 14, 1909. Serial No. 495,871.

*To all whom it may concern:*

Be it known that I, ALEXANDER H. TWOMBLY, a citizen of the United States, residing in Summit, county of Sussex, State of New Jersey, have invented a certain new and useful Composition Yielding Ozone.

The object I have in view is the production of a composition which will contain and yield ozone.

A further object is to produce a compound in which ozone will be carried for a relatively long period of time and without loss, and in which the ozone will be given off in the proper proportion.

A specific use of the invention is the production of a medicinal or pharmaceutical compound which may be applied to human tissues, and in which the ozone will be yielded in proper proportion to secure therapeutic and prophylactic action.

These and further objects will appear from the following specification:

According to my invention, I take cocoanut oil and impregnate it with ozone ($O_3$). This cocoanut oil is impregnated with ozone in any suitable manner. The impregnated oil will retain the ozone for a sufficiently long period of time to make the compound of commercial value so long as the oil remains in unmelted condition. The ozone will be liberated by the melting of the oil, which may be controlled as desired.

The compound may be used for external application, as an unguent for example. It is particularly useful for application in the nasal passages for the direct application of the ozone to the internal structures. A small amount introduced into the nostrils I find will gradually melt from the heat of the body and will liberate the ozone as it melts, the ozone being drawn into the nasal passages.

Cocoanut oil so far as I have at present observed, will retain a maximum amount of ozone. I have found by experiment that about one milligram more or less of ozone can be carried by two cubic centimeters of cocoanut oil. The combination also melts at a temperature which will give off the ozone at body heat, thereby liberating the ozone in proper quantities.

The manner of impregnating the cocoanut oil with ozone may be varied as desired and the specific means forms no portion of this invention. One way is to cause the cocoanut oil to be heated so as to be made liquid and then be carried by means of a screen or apron past a blast or blasts of ozone. The impregnated material may be removed from the screen or apron in any suitable manner, as by scraping. It may then be sealed in packages to reduce the escape of the ozone.

The drawings illustrate the diagrammatic arrangement of apparatus by means of which the cocoanut oil may be impregnated by ozone.

In the drawing, 1 represents a vessel containing the cocoanut oil in a melted condition, heat being applied by the lamp or furnace 2; 3 is the screen or apron passing over rollers as shown, and moved in the direction of the arrows; 4 is a pipe, the open end of which is directed toward the screen or apron, and the other end of which communicates with the supply of ozone; 5 is a scraper for removing material from the screen or apron; and 6 is a slide or platform for collecting the material. It is to be understood that the apron or screen passing through the melted cocoanut oil will be coated with the same, it will then be passed in front of the blast of ozone by which it will be impregnated, and the impregnated oil will be scraped off by the scraper 5 upon the screen or platform 6.

I prefer to impregnate the cocoanut oil with as much ozone as it will carry, but my invention may be carried out by using less ozone. The amount of ozone introduced will depend upon the purpose for which the material is to be employed, and also by the kind and character of the cocoanut oil used.

In certain of the claims I employ the term " stable " which I would desire to be understood as meaning that the product is substantially stable; in other words, a product which is stable for practical purposes.

In accordance with the provisions of the patent statutes I have described the principle of my invention, together with the example and the process which I now consider to represent the best embodiment thereof; but I desire to have it understood that the example and process described as merely illustrative and the invention can be carried out in other ways.

Having now described my invention, what I claim as new and desire to secure by Letters Patent is:

1. A stable composition consisting of cocoanut oil and ozone.

2. Cocoanut oil carrying ozone.

3. A solid excipient impregnated with ozone, and which melts by the heat of the body and yields ozone.

This specification signed and witnessed this 13th day of May, 1909.

ALEXANDER H. TWOMBLY.

Witnesses:
HENRY B. TWOMBLY,
W. B. PENNY, Jr.